Patented June 3, 1924.

1,496,605

UNITED STATES PATENT OFFICE.

HAROLD F. SAUNDERS, OF CLEVELAND, OHIO, ASSIGNOR TO THE CHEMICAL SPECIALTIES COMPANY, OF CLEVELAND, OHIO, A CORPORATION OF OHIO.

PROCESS FOR PRODUCING FERRIC PIGMENTS.

No Drawing. Application filed February 9, 1922. Serial No. 535,384.

*To all whom it may concern:*

Be it known that I, HAROLD F. SAUNDERS, a citizen of the United States, residing in the city of Cleveland, county of Cuyahoga and State of Ohio, have invented certain new and useful Improvements in Processes for Producing Ferric Pigments, of which the following is a specification.

My invention relates to processes for producing pigments, and more particularly relates to processes for producing ferric pigments electrolytically.

Pure ferric oxide or red oxide of iron, known in the trade as Turkey red, bright red oxide of iron, Indian red, etc., has heretofore been produced either by direct calcination of salts of iron, or by the chemical precipitation of hydrates of iron with subsequent calcination, or by dry mixing of iron salts with alkaline materials and calcination of the mixtures.

In the direct calcination of salts of iron the shades produced are difficult to control and show considerable variation from batch to batch, making necessary very careful blending and the incidental production of considerable quantities of offshade color of little value. Moreover, in this process, the large volume of acid fume and vapors evolved may constitute a nuisance which can only be eliminated by the installation of costly condensing or neutralizing apparatus.

When hydroxide of iron is precipitated chemically by the addition of alkali or alkaline salts to salts of iron in solution, the resulting precipitate is, in most cases, of such a gelatinous nature that the necessary filtration and washing becomes a difficult and costly operation. Furthermore, an additional oxidation of the precipitate by air-blowing or otherwise, is usually required in order that suitable shades may be obtained.

In the production of iron oxide by intimate mixing of salts of iron and alkalis or alkali carbonates, or alkali earths, etc., and the calcination of the resulting mixture, the product obtained consists of iron oxide mixed with a proportion of the salt of the alkali used; and in order to free the oxide from the salt an extensive washing or lixiviation is required, and the product is seldom entirely freed from the last trace of soluble salts.

It is one of the aims of this invention to overcome the disadvantages present in the processes referred to and a further aim is to produce a ferric pigment which is superior in quality to the ferric pigments produced by the processes heretofore known. Another object of this invention is to provide a process for producing ferric pigments electrolytically, which process may be carried out easily, quickly and economically, and by which the production of such pigments on a commercial scale is readily possible. A further object of my invention is to provide a process whereby the color of successive batches of pigments may easily be maintained uniform. Other objects of my invention will be in part obvious, and in part pointed out hereinafter.

I have discovered that when an electrolyte consisting of a suitable salt in solution is dissociated by the passage of an electric current into a solvent for iron and an alkaline hydrate in the presence of an iron anode, hydroxides of iron (either ferric, ferrous or ferroso-ferric) are precipitated; and these resulting products are especially well adapted to the production of the various grades of pure ferric oxide when treated by calcination in any suitable type of furnace, in that, by controlling the temperatures and current densities, the size of the precipitated particles may be absolutely controlled; the reactions so controlled, producing the iron hydrates in any degree of dispersion, from a complete colloid to a heavy granular precipitate. As an example of this control, it is found that when a low current density (not substantially over 10 amperes per square foot) is maintained, and also when the electrolyte is maintained in a slightly acid condition (between .1 and .5 grams acid per liter) that a hydroxide of iron is obtained which has extreme fineness of particle. The size of the iron hydroxide particles produced increases as the current density is increased. Furthermore, these pigments have an unusual and high degree of brilliancy, opacity and staining power, and have great freedom from acids and soluble salts, and therefore the quality of these pigments is greatly superior to the quality of the pigments produced by processes which have been heretofore known. Pigments may be readily produced in commercial quantities and in uniform colors by this process.

Any soluble salt which may be ionized to produce a substance capable of dissolving ferrous material is suitable for the electrolytic bath. There are many such salts, and they may be either acid, alkali or neutral in character.

The salts may be used individually in solution, in mixtures with each other, or in combinations with other materials. If desired, catalysts may be employed in the solution. In this way, also, the valency of the iron in the resulting precipitate may be controlled. As example of suitable salts, I mention sodium chloride in solution, sodium sulphate in solution, a solution of nitre cake, and sodium nitrate in solution.

Any ferrous material which is a conductor for electricity will serve as the anode, for instance, scrap iron, sheet iron, cast iron, etc. The cathode may also be of iron but any conducting material will serve the purpose.

When electricity is conducted through the electrolyte, electrolysis sets in, and the electrolyte is dissociated to form an alkaline hydrate and an acid according to the salt used. The acid irons combine with the anodic iron to form a soluble iron salt, which in turn, unites with the alkaline hydrate to form hydrates of iron in any desired degree of dispersion, and may be removed from the bath by filtration or other suitable means. These hydroxides of iron may be dried and used directly as pigments, or treated in a suitable furnace at the temperature necessary to produce the desired opacity and shade of red oxide of iron.

As an example of my process, an electrolytic bath is prepared by dissolving sodium chloride in water. A plate of iron is placed in the bath as an anode, and a cathode also of iron is provided. When an electric current is passed through this bath from anode to cathode, the sodium chloride is separated into metallic sodium at the cathode and chlorine at the anode. The sodium immediately combines with the water of the bath to form sodium hydroxide, while the chlorine combines with the iron anode to form chloride of iron. The iron chloride then reacts with the sodium hydroxide producing hydroxides of iron and sodium chloride which is thus replaced in the bath, the hydroxides of iron appearing as a precipitate. This precipitate is removed from the bath by filtration, and passed to a muffle furnace maintained at the temperature required to produce the shade and opacity desired. This temperature may vary from 500 degrees F. to 1800 degrees F. in accordance with ordinary furnace practice. The product obtained is a red powder which according to the temperatures used in the calcination will vary in tone from a yellowish red to a bluish red, admirably adapted for use as a pigment in paints, inks or other purposes.

It will be readily apparent that by means of my process various difficulties and disadvantages present in the former processes are avoided, and that the consuming and using up of additional chemical products, as is necessary in the processes heretofore known, is avoided.

Since many different salts may be used in the electrolytic bath, and since many different ferrous materials may be used for the anode, and as many other changes could be made in carrying out the above process without departing from the scope of my invention, it is intended that all matter contained in the above description shall be interpreted as illustrative and not in a limiting sense. It is also to be understood that the language used in the folowing claims is intended to cover all the generic and specific features of the invention herein described, and all statements of the scope of the invention which as a matter of language, might be considered to fall therebetween.

What I claim is:—

1. A process of producing ferric pigment, which includes the step of producing iron hydroxides electrolytically, using low current density.

2. A process of producing ferric pigments, which includes the step of producing iron hydroxides electrolytically, using an electrolyte consisting of a solution of an ionizable salt yielding acid ions.

3. A process of producing ferric pigment which includes the step of producing iron hydroxides electrolytically, using low current density and using an electrolyte consisting of a solution of an ionizable salt.

4. A process of producing ferric pigments which includes the step of electrolytically producing iron hydroxides in colloidal form by using low current density and an electrolyte consisting of an acid solution of an ionizable salt.

5. A process of producing a ferric pigment, which includes the step of producing iron hydroxides electrolytically, using current density not over 10 amperes per square foot.

6. A process of producing ferric pigment, which includes the step of producing iron hydroxides electrolytically, using an electrolyte consisting of a solution of an ionizable salt and maintained at an acidity between .1 and .5 grams acid per liter.

7. A process of producing ferric pigment, which includes the step of producing iron hydroxides electrolytically, using current density between 5 and 10 amperes per square foot and using an electrolyte consisting of a solution of an ionizable salt having acidity between .1 and .5 grams per liter.

8. A process which consists of producing oxide of iron by calcining hydroxide of iron obtained electrolytically, using low current density and an electrolyte consisting of a solution of an ionizable salt having acidity.

9. A process of the character described, which consists of providing an electrolytic bath comprising an acid solution of an ionizable salt, providing a ferrous anode in said bath, and a conducting cathode, and establishing electrolysis, maintaining low current density whereby hydroxide of iron is produced in said bath, and treating said hydroxide of iron by calcination to produce a red ferric pigment.

10. As an article of manufacture, a ferric pigment characterized by extreme fineness of particle, derived from the electrolysis of an acid solution of an ionizable salt in the presence of an iron anode and using low current density.

11. As an article of manufacture, iron hydroxide in substantially colloidal form and which is adaptable to conversion into a ferric pigment by heat.

12. As an article of manufacture, a red ferric pigment obtained by the calcination of iron hydroxide derived electrolytically, using low current density and an electrolyte consisting of an acid solution of an ionizable salt.

This specification signed and witnessed this 6th day of February, 1922.

HAROLD F. SAUNDERS.

Witnesses:
HAROLD W. DINNEEN,
C. C. WILLIAMS.